United States Patent [19]

Chen

[11] Patent Number: 5,520,316
[45] Date of Patent: May 28, 1996

[54] STORAGE RACK FOR AUTOMOBILE TRUNKS

[76] Inventor: Shu F. Chen, 11-3, Lane 2, Avenue 129, Chu-Kuang St., Chung-He City, Taipei Hsien, Taiwan

[21] Appl. No.: 381,174

[22] Filed: Jan. 31, 1995

[51] Int. Cl.[6] ................................................ B60R 9/00
[52] U.S. Cl. .................... 224/539; 224/542; 224/925; 224/567; 211/12; 211/175; 211/182; 211/184; 296/37.1
[58] Field of Search ................................ 224/539, 540, 224/549, 550, 566, 925, 403, 404, 405, 42.01, 485, 542, 273, 567, 309, 311, 314; 296/37.1; 211/175, 182, 184, 12

[56] References Cited

U.S. PATENT DOCUMENTS

| | | | |
|---|---|---|---|
| 3,912,139 | 10/1975 | Bowman | 224/403 |
| 4,270,681 | 6/1981 | Ingram | 224/321 |
| 4,516,709 | 5/1985 | Bott | 224/321 |
| 4,538,737 | 9/1985 | Delaney | 224/539 |
| 4,684,087 | 8/1987 | Spickard | 224/925 |
| 4,858,803 | 8/1989 | Gerber | 224/309 |
| 4,867,362 | 9/1989 | Finnegan et al. | 224/319 |
| 5,234,116 | 8/1993 | Kristinsson et al. | 224/542 |

FOREIGN PATENT DOCUMENTS

| | | | |
|---|---|---|---|
| 2583357 | 12/1986 | France | 224/309 |
| 3135649 | 3/1983 | Germany | 224/321 |
| 3428154 | 2/1986 | Germany | 224/321 |
| 1387822 | 3/1975 | United Kingdom | 224/314 |
| 2247651 | 3/1992 | United Kingdom | 296/37.1 |

Primary Examiner—Henry J. Recla
Assistant Examiner—Gregory M. Vidovich
Attorney, Agent, or Firm—Pro-Techtor International

[57] ABSTRACT

A storage rack for automobile trunks, which consists of two supporting bars, two bracing bars, and a multiple number of sliding and tightening pieces. The storage rack for automobile trunks, which can be readily installed in a typical automobile trunk, may be used to secure objects of different sizes, thereby preventing these objects from being damaged during transportation.

5 Claims, 5 Drawing Sheets

5,520,316

STORAGE RACK FOR AUTOMOBILE TRUNKS

BACKGROUND OF THE INVENTION (1) Field of the Invention

The present invention relates to a storage rack for automobile trunks which consists of two supporting bars, two bracing bars, and a multiple number of sliding pieces and tightening pieces. The storage rack for automobile trunks of the present invention, which can be readily installed in a typical automobile trunk, can be employed to secure objects of different sizes, thereby preventing these objects from being damaged during transportation.

(2) Description of the Prior Art

Most motor vehicles are equipped with a rear trunk for storage. Typically, the rear trunk is an empty space which does not provide a means for holding transported objects in place. In order to prevent the transported objects from being damaged during transportation, the objects are often wrapped in a packaging material, which is inconvenient. It is thus important to provide a means for securing transported objects in a trunk.

To satisfy this need, the present invention offers a storage rack for automobile trunks, the principal objective of which is to provide a storage rack for automobile trunks, which can be readily installed and which offers a means for keeping transported objects in place.

Another objective of the present invention is to provide a storage rack for automobile trunks, which is equipped with a multiple number of adjustable holding pieces to hold objects of different sizes in place.

Another objective of the present invention is to provide a storage rack for automobile trunks which can be installed in an automobile trunk holding a spare tire or after the spare tire has been removed.

DESCRIPTION OF THE PREFERRED EMBODIMENT

Figure 1:
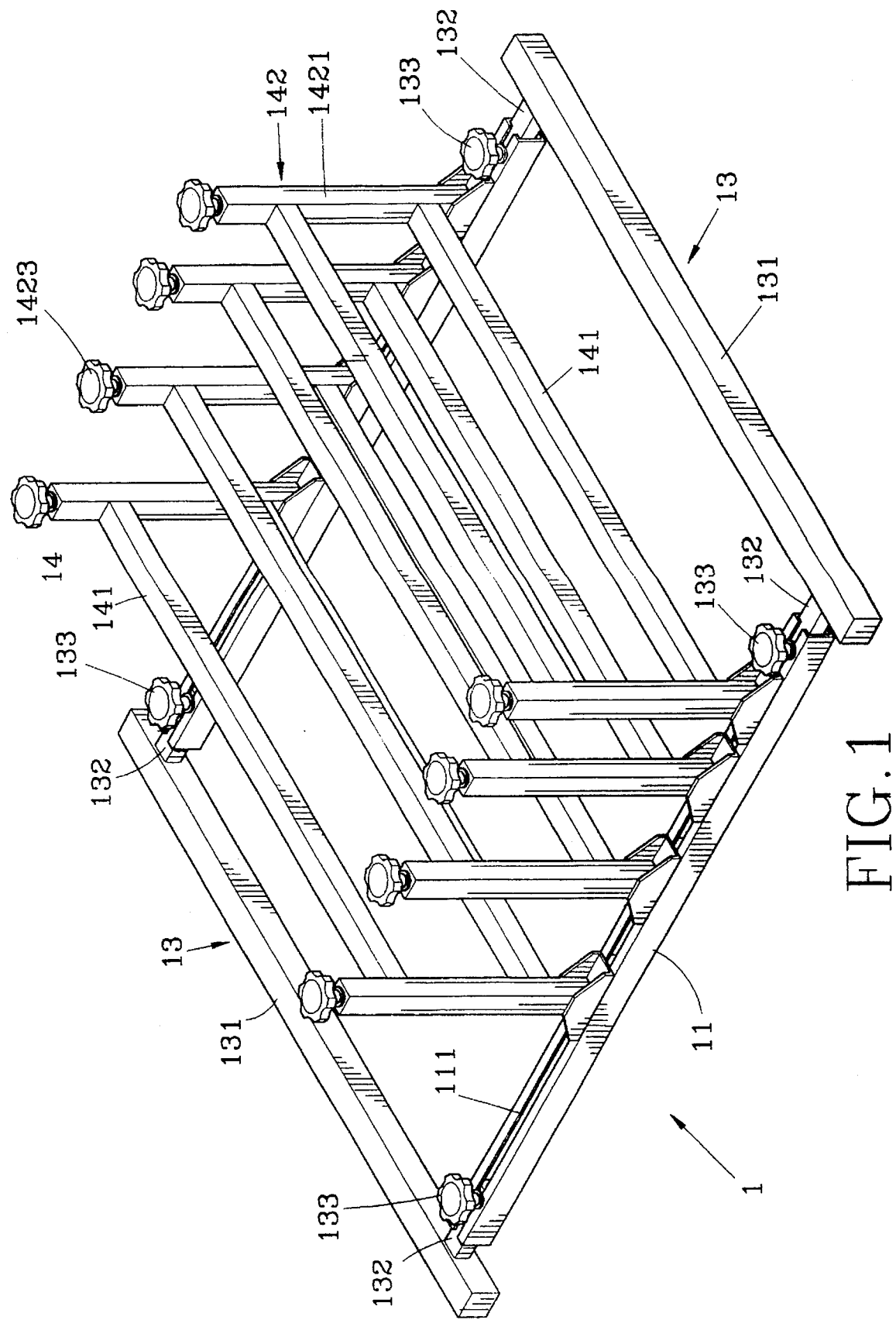
FIG. 1: A three-dimensional view of the preferred embodiment of the present invention.
Figure 2:
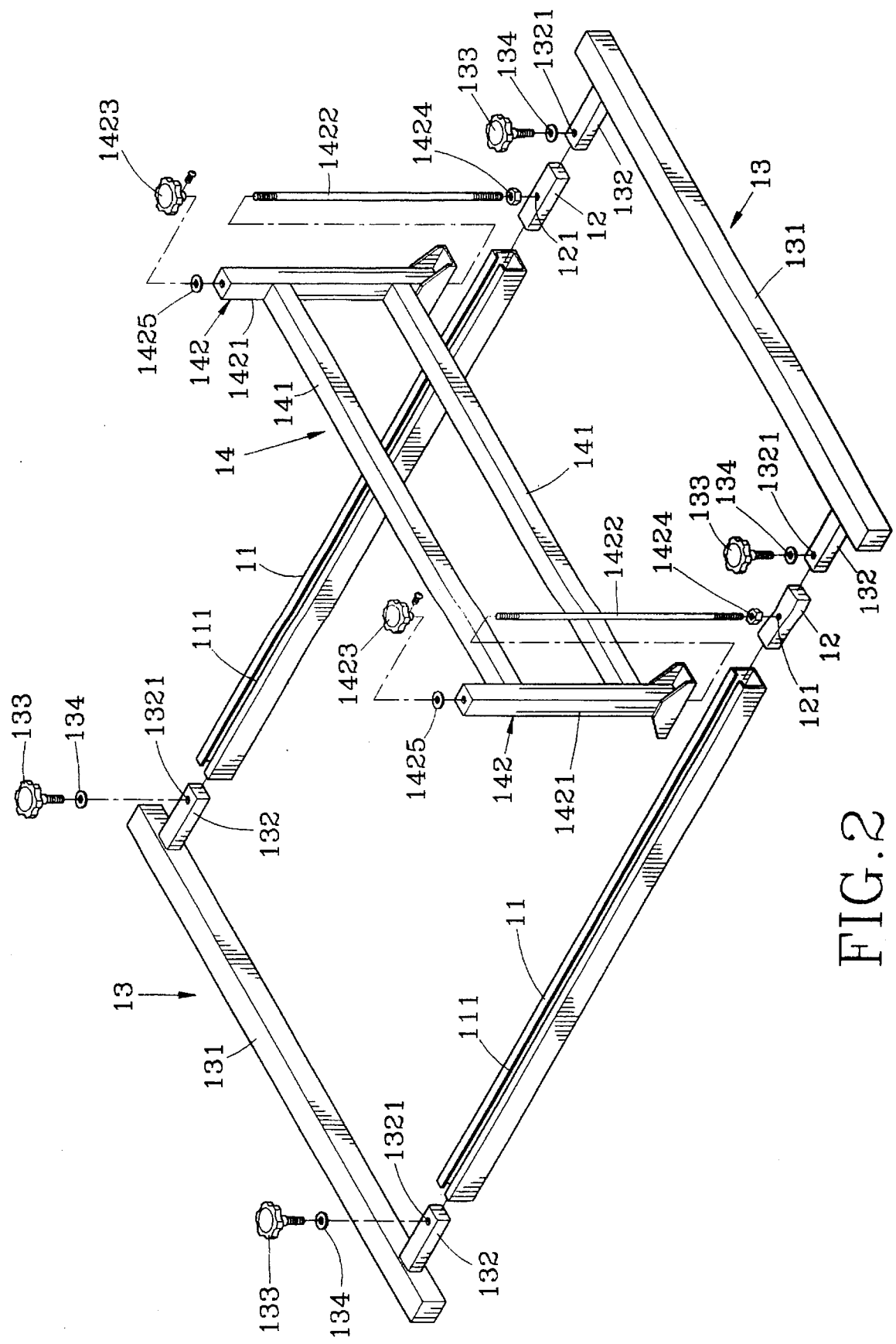
FIG. 2: A dissection drawing of the preferred embodiment of the present invention.

As shown in FIGS. 1 and 2, the storage rack 1 of the present invention for automobile trunks comprises two supporting bars 11, a multiple number of sliding pieces 12, two bracing bars 13 and a multiple number of holding pieces 14, wherein one side of the supporting bar is equipped with a sliding track 111, and the two ends of the sliding track 111 are open to allow a multiple number of sliding pieces 12 to be inserted into the supporting bar 11.

One side of the sliding piece 12 is equipped with a threaded hole 121, and the sliding piece 12 can slide inside the sliding track 111 of the supporting bar 11 so that the position of the sliding piece 12 can be adjusted.

The bracing bar 13 consists of a bar 131, two connecting sliding bars 132, two screw knobs 133 and two tightening washers 134.

The two connecting sliding bars 132, which are installed on the two sides of the bar 131, are parallel to each other facing the same direction and each is equipped with a threaded hole 1321 in the corresponding position. Each of the two connecting sliding bars 132 of the bracing bars 13 can be inserted into the supporting bar 11. After the connecting sliding bar 132 has been inserted into the supporting bar 11, the threaded hole 1321 of the connecting sliding bar 132 is aligned with the sliding track 111 of the supporting bar 11. Each of the two screw knobs 133 dressed with a tightening washer 134 is inserted through the sliding track 111 of the supporting bar 11 and screwed into the threaded hole 1321 of the connecting sliding bar 132 inside the supporting bar 11.

Figure 3:
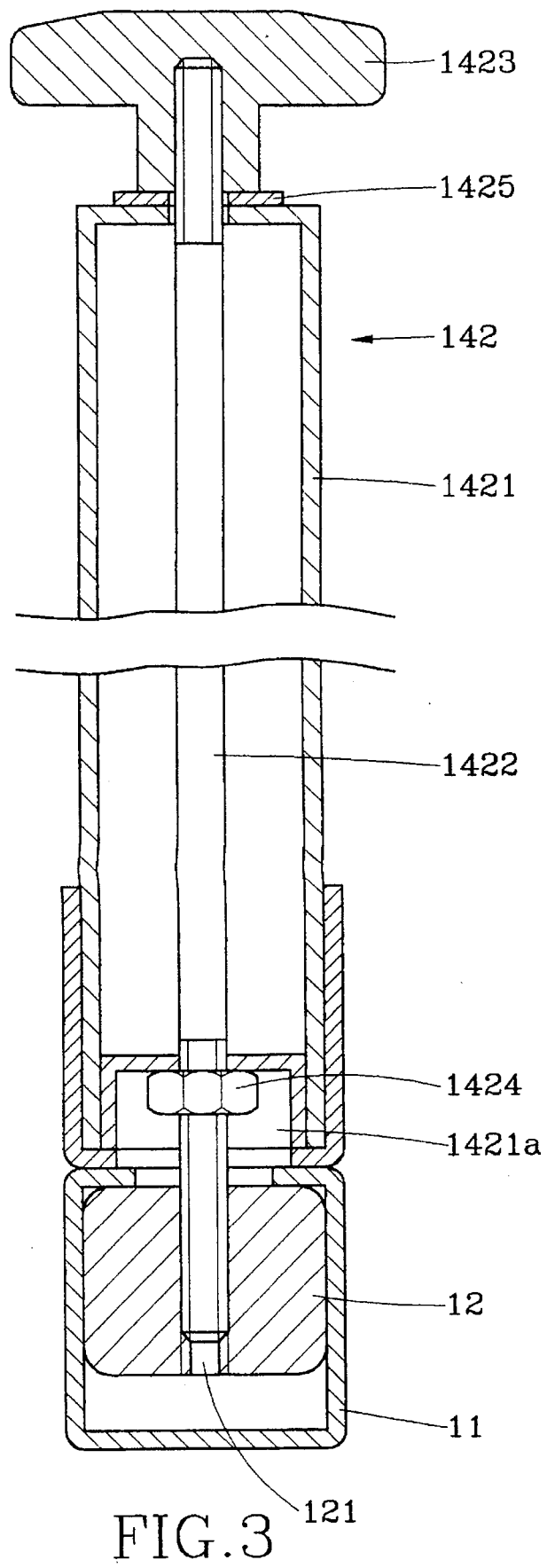
FIG. 3: A cross-sectional view of the assembly of the vertical bar, supporting bar and sliding piece of the adjustable holding pieces of the preferred embodiment of the present invention.

The holding piece 14 comprises two horizontal bars 141 and two vertical bars 142. The vertical bar 142 comprises an outer shell 1421, a threaded rod 1422, an adjusting knob 1423, a positioning nut 1424 and a tightening washer 1425. As shown in FIGS. 2 and 3, the outer shell 1421 is hollow with open ends, and the bottom of the outer shell 1421 is equipped with a hollow recessed chamber 1421a. The upper part of the threaded rod 1422, which is dressed with a tightening washer 1425, is equipped with the adjusting knob 1423, which can be joined by means of an adhesive. The threaded rod 1422, now equipped with a tightening washer 1425 and adjusting knob, is inserted from the top of the hollow outer shell 1421 through a hole at the bottom thereof inside the hollow recessed chamber 1421a, and the protruding threaded rod 1422 is screwed into the positioning nut 1424. The length of the threaded rod 1422 is sufficient to allow it to extend from the positioning nut 1424 into the sliding track 111 of the supporting bar 11 and screw into the threaded hole 121 of the sliding piece 12 inside the sliding track 111, so that the bottom of the vertical bar 142 of the holding piece 14 presses tightly against the sliding track 111 of the supporting bar 11.

Upon aligning the holding piece 14 with the supporting bar 11, the positioning nut 1424 screwed onto the threaded rod 1422 prevents the threaded rod 1422 from being turned upward from the hollow recessed chamber 1421a at the bottom of the outer shell 1421, so that the bottom of the threaded rod 1422 is always screwed into the sliding piece 12 inside the supporting bar 11, and the bottom of the vertical bar 142 of the holding piece 14 corresponds to the sliding track 111 of the supporting bar 11 in a loosened state to allow the adjustment of the holding piece 14 in order that it may conform to the shape of the object to be held in place.

Figure 4:
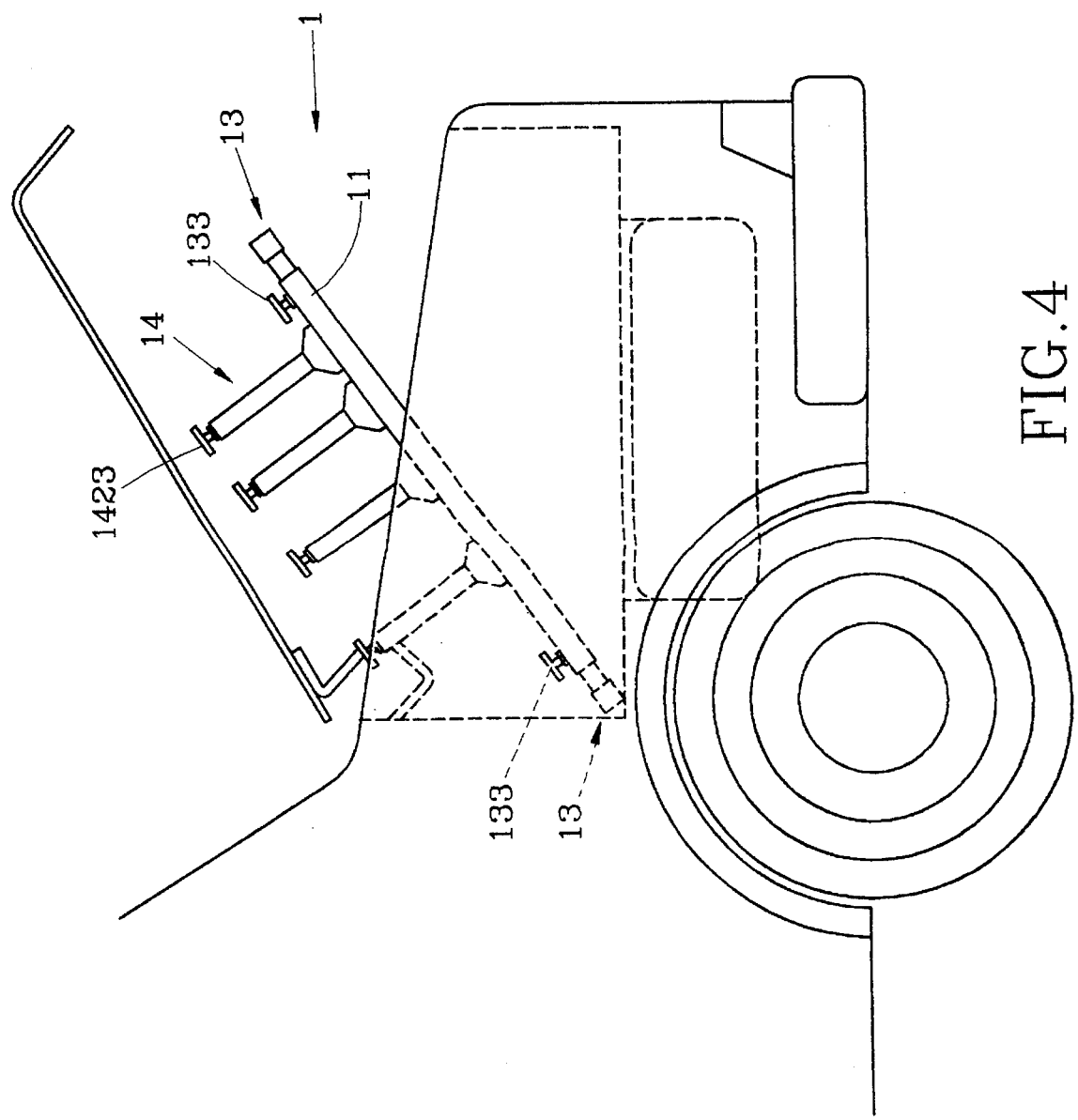
FIG. 4: A drawing showing the storage rack of the present invention being installed in an automobile trunk.
Figure 5:
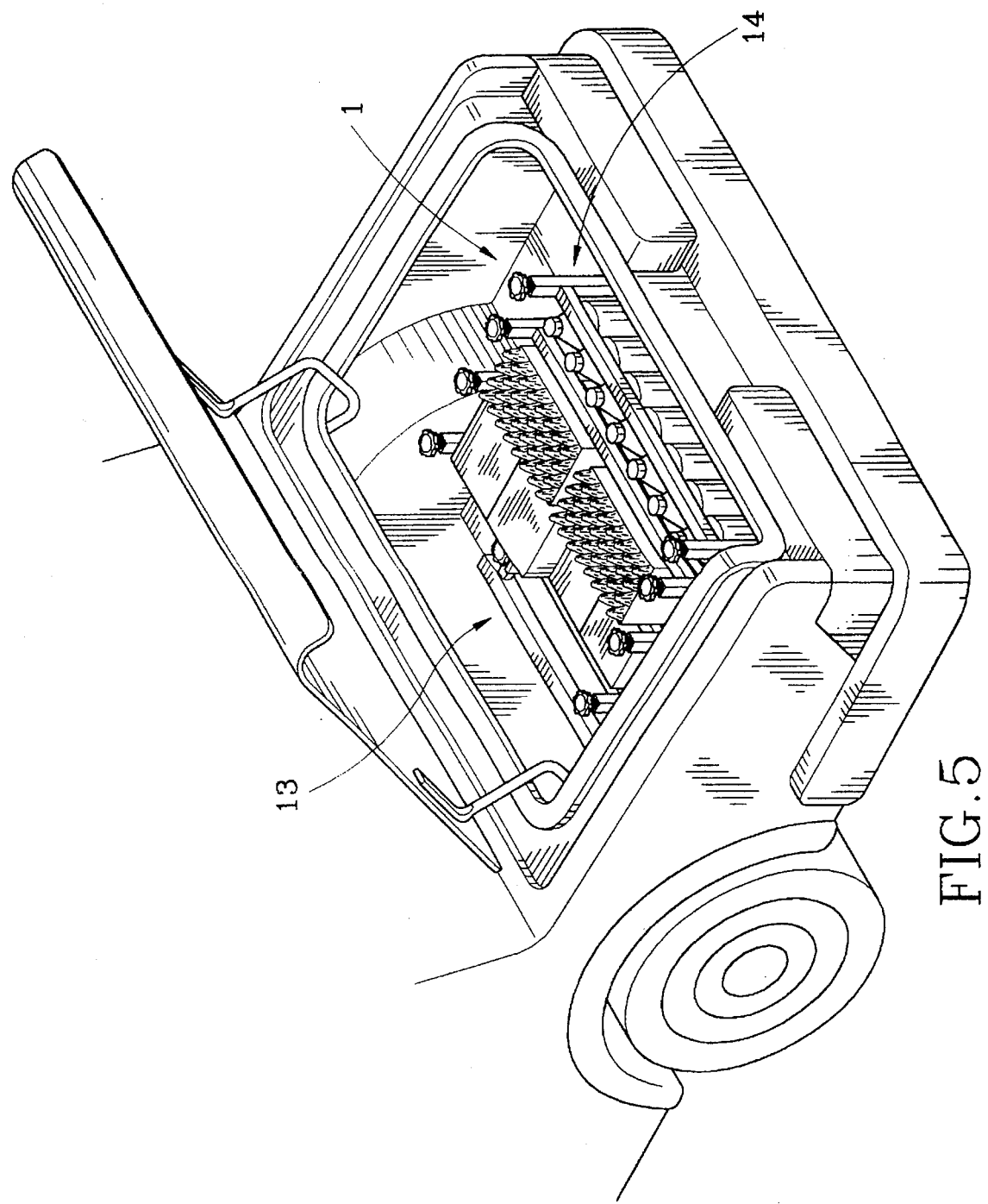
FIG. 5: A drawing showing objects of different sizes being held in place by the storage rack of the present invention inside an automobile trunk.

As shown in FIGS. 1 and 2, the storage rack of the present invention for automobile trunks comprises a multiple number of sliding pieces 12 inserted into the two sliding tracks 111 of a pair of supporting bars 11, and a pair of bracing bars 13, each of each is equipped with a pair of connecting sliding bars 132 to be mounted on the same end of the pair of supporting bars 11. As shown in FIGS. 2 and 3, each of the pair of vertical bars 142 of the holding piece 14 is screwed into a corresponding sliding piece 12 inside the sliding track 111 of the supporting bar 11, so that a multiple number of holding pieces 14 are mounted on the pair of supporting bars 11 in parallel. Each of the two connecting sliding bars 132 of the other bracing bar 13 is inserted into the other end of the supporting bar 11. As shown in FIGS. 4 and 5, the storage rack 1 is placed inside the trunk, one bracing bar 13 is placed against the front of the trunk, and the position of the other bracing bar 13 is adjusted along the supporting bar 11 to allow said bracing bar 13 to press against the rear of the trunk. The two connecting sliding bars 132 at the front of the trunk are held tightly in the pair of supporting bars 11 by means of the two screw knobs 133 of the other bracing bar 13. With the storage rack 1 held in place inside the trunk in the manner described above, the storage rack 1 is prevented from being moved by external forces. The user can adjust the distance between the holding pieces 14 on the supporting bars 11 to accommodate objects of different sizes.

When the storage rack of the present invention for automobile trunks is employed to hold objects of different sizes in place, the threaded rod 1422, which is equipped with an adjusting knob 1423 along the two sides of the holding piece 14 is turned in a reverse direction, thereby slightly reducing the tension of the threaded rod 1422 held by the threaded hole 121 in the sliding piece 12 inside the supporting bar 11, loosening the grip between the vertical bar 142 along the two sides of the holding piece 14 and the corresponding supporting bar 11, and allowing the holding piece to be moved. After the distance between adjacent holding pieces 14 has been adjusted to accommodate objects of a certain size, the threaded rod 1422, which is equipped with the adjusting knob 1423, is turned in the tightening direction to cause the threaded rod 1422 to be screwed further into the threaded hole 121 of the corresponding sliding piece 12, thereby increasing the grip between the vertical bar 142 along the two sides of the holding piece 14 and the sliding track 111 of the supporting bar 11. Thus, objects placed between the holding pieces 14 in the storage rack are prevented from being damaged during transportation.

As shown in FIGS. 4 and 5, the spare tire can still be removed even after the storage rack 1 of the present invention has been installed in the trunk by simply loosening the pair of screw knobs 133 on the two sides of the bracing bars 13, and pushing the two connecting sliding bars 132 held by the pair of supporting bars 11 to move further into the supporting bars 11, thereby forming a space between the bracing bar 13 at the rear of the storage rack 1 and the rear of the trunk. The rear of the storage rack 1 can then be lifted to provide sufficient space for removing the spare tire below the storage rack 1.

The preceding description illustrates the principal features of the present invention. However, the present invention is not restricted to the above description, but is characrerized by the scope of the claims below.

What is claimed is:

1. A storage rack for use in an automobile trunk, said rack comprising:

two supporting bars each having a sliding track defined in an open top side thereof;

two bracing bar, each said bracing bars being slidably received with both of said supporting bars such that the distance between said bracing bars is variable;

a plurality of holding pieces, said holding pieces forming a plurality of holding areas bounded by said holding pieces; and a plurality of sliding pieces, each of said holding pieces being supported by at least one of said sliding pieces, said sliding pieces being inserted into said sliding track such that a distance between one of said bracing bars and one of said holding pieces is variable, as is a distance between any two of said holding pieces so that the size of each of the holding areas is variable;

each said bracing bar having a pair of connecting sliding bars slidably received in said supporting bars and means for fixing at least one of said connecting sliding bars relative to said supporting bars comprising a screw knob dressed with a tightening washer wherein said screw knob is inserted into said sliding track through said open top side and is received in a threaded hole in said at least one connecting sliding bar such that a position of said at least one connecting sliding bar is fixed by tightening said screw knob.

2. The storage rack of claim 1 wherein ends of each said supporting bar are open such that the sliding pieces are easily inserted into said sliding track.

3. The storage rack of claim 1 wherein an upper surface of each said sliding piece includes a threaded hole adapted to receive a first end of a threaded rod which passes through an end of said sliding piece and a second end of said threaded rod having an adjusting knob affixed thereto such that a user may secure a position of said holding piece relative to said supporting bars by tightening said adjusting knob.

4. The storage rack of claim 1 wherein each said holding piece comprises a pair of horizontal bars and a pair of vertical bars interconnected therewith.

5. The storage rack of claim 4 wherein said vertical bars of said holding piece are hollow with open ends, a lower end of each said vertical bar including an enlarged recessed chamber.

* * * * *